(12) United States Patent
Ushiwata et al.

(10) Patent No.: US 8,127,650 B2
(45) Date of Patent: Mar. 6, 2012

(54) MITER SAW

(75) Inventors: Shigeharu Ushiwata, Hitachinaka (JP); Kenichi Matsunaga, Hitachinaka (JP); Toshihiko Hayashizaki, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 431 days.

(21) Appl. No.: 12/280,355

(22) PCT Filed: Feb. 19, 2007

(86) PCT No.: PCT/JP2007/053446
§ 371 (c)(1),
(2), (4) Date: Aug. 22, 2008

(87) PCT Pub. No.: WO2007/099884
PCT Pub. Date: Sep. 7, 2007

(65) Prior Publication Data
US 2009/0031875 A1 Feb. 5, 2009

(30) Foreign Application Priority Data

Feb. 22, 2006 (JP) ................. P2006-045867

(51) Int. Cl.
*B27B 5/20* (2006.01)
(52) U.S. Cl. ............. 83/471.3; 83/487; 83/581
(58) Field of Classification Search ............. 83/471.2, 83/471.3, 472, 473, 477.1, 477.2, 485, 487–490, 83/581
See application file for complete search history.

(56) References Cited

U.S. PATENT DOCUMENTS

| 4,537,105 A | * | 8/1985 | Bergler | 83/471.3 |
| 5,054,352 A | * | 10/1991 | Fushiya et al. | 83/468.3 |
| 5,063,802 A | * | 11/1991 | Shiotani et al. | 83/98 |
| 5,495,784 A | * | 3/1996 | Chen | 83/471.2 |
| 5,862,732 A | * | 1/1999 | Itzov | 83/471.3 |
| 5,988,031 A | | 11/1999 | Wixey | |
| 6,016,732 A | * | 1/2000 | Brault et al. | 83/471.3 |
| 6,854,372 B2 | * | 2/2005 | Anthony | 83/441 |
| 6,901,834 B2 | * | 6/2005 | Chang | 83/486.1 |
| 6,918,330 B2 | * | 7/2005 | Ng et al. | 83/471.3 |
| 6,997,091 B1 | | 2/2006 | Shibata | |
| 2007/0074611 A1 | * | 4/2007 | Hu | 83/471.2 |

FOREIGN PATENT DOCUMENTS

| CA | 2 372 451 | | 8/2003 |
| DE | 20 2004 004 929 U1 | | 7/2004 |
| EP | 0622145 A | * | 3/1993 |
| EP | 0 622 145 A1 | | 11/1994 |

(Continued)

*Primary Examiner* — Edward Landrum

(74) *Attorney, Agent, or Firm* — Antonelli, Terry, Stout & Kraus, LLP

(57) ABSTRACT

A miter saw includes a base unit, a cutting unit having a rotary cutting blade, a motor for driving the rotary cutting blade, and a housing having a blade cover for covering a part of the cutting blade and a motor housing connected to the blade cover, a supporting unit supported to the base unit for pivotably supporting the cutting unit, the supporting unit being configured to move the cutting unit toward and away from the base unit in a first direction, the supporting unit including a guide unit supported with respect to the base unit, and a sliding unit having a pivot shaft pivotably supporting the cutting unit, the sliding unit being slidable on the guide unit to move between a front position and a rear position in the second direction and the pivot shaft extending in a third direction which is perpendicular to the first and second directions.

5 Claims, 6 Drawing Sheets

FOREIGN PATENT DOCUMENTS

| | | |
|---|---|---|
| EP | 1 369 196 A1 | 12/2003 |
| EP | 1 625 906 | 2/2006 |
| JP | 9-164504 | 6/1997 |
| JP | 11-34001 | 2/1999 |
| JP | 2005-279933 | 10/2005 |
| JP | 2005-279934 | 10/2005 |
| JP | 2007-223128 | 9/2007 |
| WO | WO 03/097284 | 11/2003 |

* cited by examiner

FRONT ← → REAR

MITER SAW

TECHNICAL FIELD

The present invention relates to a miter saw. More particularly, the invention relates to a miter saw having a guide unit to guide a cutting blade in a direction substantially perpendicular to a pivot shaft of the cutting blade.

BACKGROUND ART

Miter saws have been well-known. The miter saw generally has a base unit, a cutting unit, and a support unit. The base unit holds a workpiece to be cut. The cutting unit has a circular saw blade to be driven by a motor. The support unit supports the cutting unit and enables the cutting unit to rotate about a pivot shaft which is substantially parallel to the rotation shaft of the circular saw blade. The support unit is coupled to the base unit so as to incline with respect to the upper surface of the base unit. Japanese Patent Application Publication No. 2005-279933 discloses a miter saw having the above configuration.

In the miter saw in the above publication, the support unit is supported to the base unit at one end thereof, and has a guiding support section on the other end. The support unit has a guide unit. The guide unit consists of two pipes which are supported by a guiding support section at one end thereof and extend in a direction perpendicular to the pivot shaft. A sliding unit is provided at the other end of the guide unit having the pivot shaft. The sliding unit is slidable along the guide unit between a front position and a rear position. The slide of the sliding unit along the guiding units moves the cutting blade in the sliding direction perpendicular to the pivot shaft. If a workpiece is mounted on the upper surface of the base unit and the cutting blade is moved in the sliding direction, the miter saw can cut the workpiece.

In the conventional miter saw, however, the motor is provided above the cutting blade. The miter saw inevitably has a large height. The cutting unit with the motor projects from one side of the cutting blade, while the two pipes are arranged on the other side of the cutting blade. Therefore, the miter saw has a large dimension in the direction of the rotary shaft of the cutting blade. Consequently, it is difficult to minimize the miter saw.

Accordingly, an object of the present invention is to provide a miter saw which is made compact and has a wide sliding range of the cutting blade along a guide unit to cut a workpiece.

DISCLOSURE OF INVENTION

The present invention provides a miter saw having: a base unit, a cutting unit, and a supporting unit. The base unit supports a workpiece. The cutting unit has a rotary cutting blade having two side faces, a motor for driving the rotary cutting blade, and a housing having a blade cover for covering a part of the cutting blade and a motor housing provided to the blade cover on one side face of the rotary cutting blade for accommodating the motor. The supporting unit is supported to the base unit for pivotably supporting the cutting unit. The supporting unit is configured to move the cutting unit toward and away from the base unit in a first direction. The support unit has a guide unit supported to the base unit, and a sliding unit having a pivot shaft pivotably supporting the cutting unit. The guide unit extends parallel to a second direction and having a front end. The sliding unit is guided by the guide unit to move between a front position and a rear position in the second direction. The pivot shaft extends in a third direction perpendicular to the first and second directions. The motor housing has a proximal end to the rotary cutting blade and a distal end in the third direction. At least one part of the guide unit is positioned on the one side face and between the cutting blade and the distal end in the third direction. When the sliding unit is positioned at the rear position, a first distance between the pivot shaft and a closest point of the motor housing to the pivot shaft in a plane extending in the first direction and containing the guide unit is longer than a second distance between the pivot shaft and the front end of the guide unit in the plane.

In the above aspect of the miter saw, when the sliding unit is positioned at the rear position, the first distance is longer than the second distance. When at least one part of the guide unit is provided on the same side as the motor housing with respect to the cutting blade and between the cutting blade and the distal end of the motor housing in the third direction, and the sliding unit is moved between the front position and the rear position, the motor housing can be prevented from contacting the guide unit regardless of the position of the sliding unit with respect to the guide unit, while the rotary cutting blade cuts the workpiece on the base unit.

As described above, the part of the guide unit is provided on the same one side face of the cutting blade as the motor housing with respect to the cutting blade. Hence, when the supporting unit is tilted to the base unit on the other side face of the cutting blade to cut the workpiece in a slanting direction, the guide unit and the motor housing can be prevented from abutting the workpiece on the other side of the cutting blade. The miter saw can used as a single side inclination type in which the cutting blade is inclined to one side from a vertical direction, the one side being opposite to the side on which the motor is provided.

The motor housing is provided on one side face of the cutting blade rather than above the blade cover. Therefore, the height of the miter saw can be reduced. Further, at least one part of the guide unit is provided on the same side as the motor housing with respect to the cutting blade and between the cutting blade and the distal end of the motor housing in the third direction. Accordingly, the guide unit does not protruding from a range between the cutting blade and the distal end of the motor housing. Thus, the miter saw can be minimized. The miter saw can have a compact configuration.

Since the motor is not provided above the cutting blade, the drive coupling mechanism coupling the rotation shaft of the motor and the rotation shaft of the cutting blade can be simple. This can simplify the configuration of the miter saw and lighten the miter saw. The manufacturing cost of the miter saw can be reduced.

Even if the guide unit is configured to move back and forth with respect to the base unit, the miter saw can cut the workpiece without protruding the guide unit backwards. Therefore, the rear section of the miter saw can be made compact.

In another aspect of the present invention, the rotary motor of the motor is located in front of the rotary shaft of the cutting blade when the cutting unit is positioned at a lowest position. This structure maintains the first distance to be longer than the second distance. Further, the motor can be provided at as a lower level as possible.

In further another aspect of the present invention, the guide unit has a pair of pipes, and an imaginary plane containing the axes of the pipes is substantially parallel to the first direction. Therefore, the size of the miter saw in the third direction can be reduced. Thus, the miter saw can be made compact. Further, the pivot shaft is located above the midpoint between the axes of the pipes. Therefore, when the sliding unit is positioned at the rear position, the first distance is always made longer than the second distance.

In further aspect of the invention, one of the pipes is made shorter than the other pipe. The miter saw can be made lighter.

In further aspect of the invention, the lowest end of the pipes is positioned above the lowest end of the motor housing in the first direction when the cutting unit is positioned at a lowest position in the first direction. rotated to the lowest position. Therefore, the lowest end of the pipes are prevented from abutting the workpiece when the cutting unit is rotated to cut the workpiece.

Figure 1:
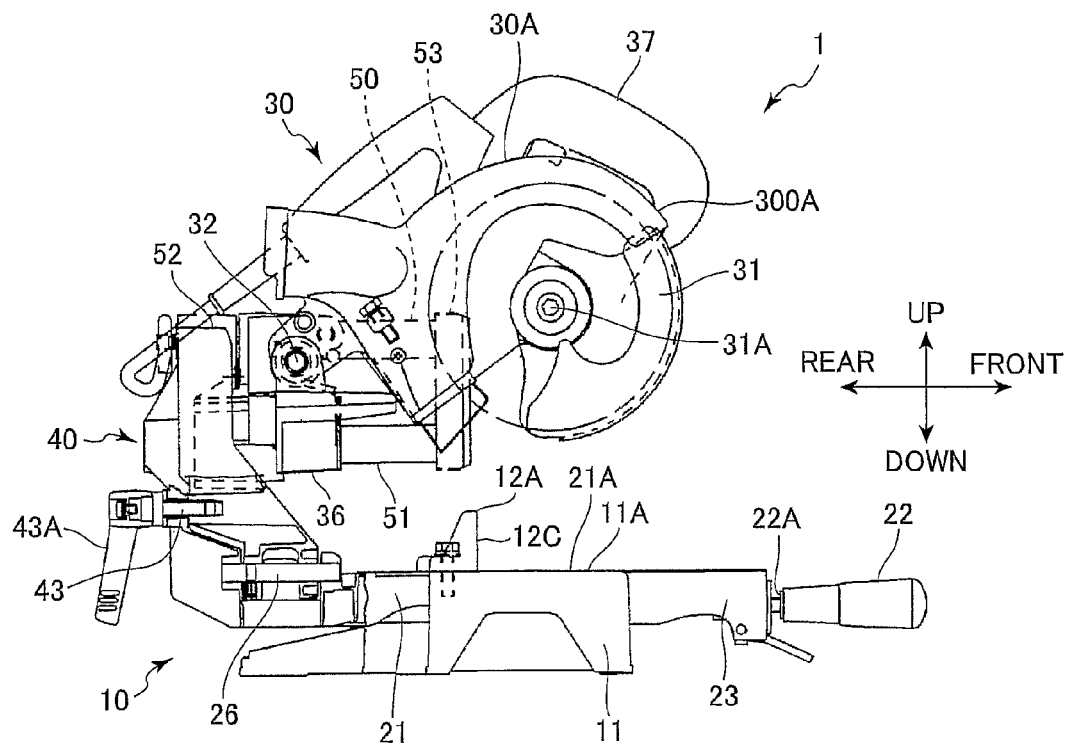
FIG. 1 is a left side view showing a miter saw according to an embodiment of the present invention.

BRIEF EXPLANATION OF REFERENCE NUMERALS 1 miter saw
10 base unit
30 cutting unit
30A housing
31 cutting blade
32 pivot shaft
33 motor
36 sliding unit
40 supporting unit
50, 51 pipes of guide unit
300A blade cover
300B motor housing
300Ba proximal end
300Bb distal end

BEST MODE FOR CARRYING OUT THE INVENTION

A miter saw according to an embodiment of the present invention will be described, with reference to FIGS. 1 to 11. The expressions "front", "rear", "above", "below", "right", and "left" are used throughout the description to define the various parts when the miter saw is disposed in an orientation in which it is intended to be used.

Figure 2:
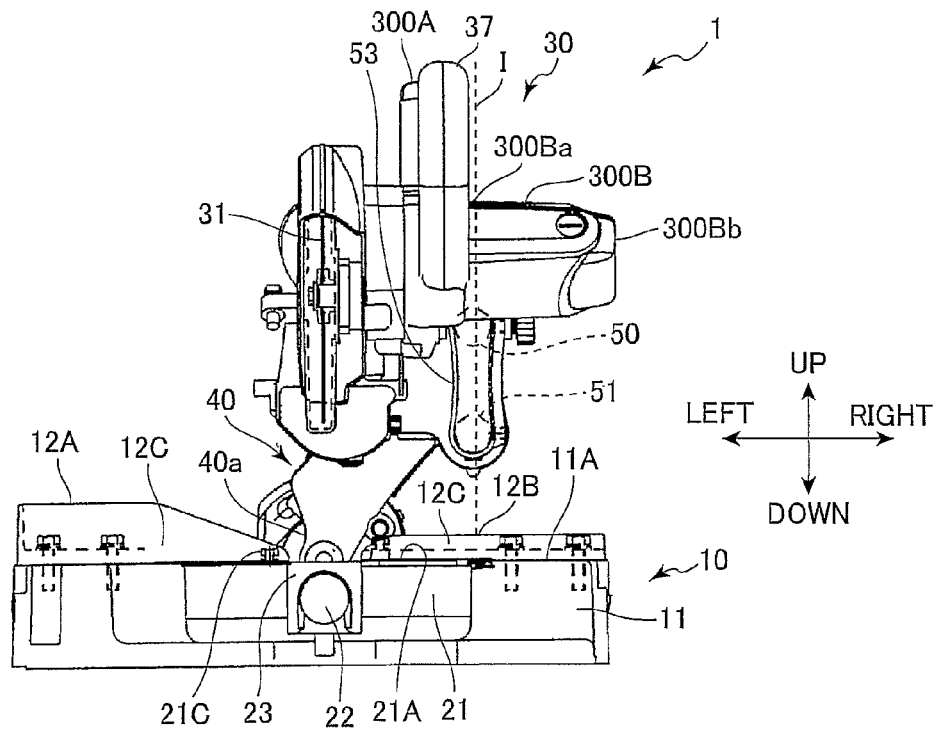
FIG. 2 is a front view showing the miter saw of FIG. 1.

For convenience of explanation, the right side of FIG. 1 is regarded as front, the left side of FIG. 1 is regarded as back; and the left side of FIG. 2 is regarded as left, the right side of FIG. 2 is regarded as right.

FIG. 1 shows a table circular saw 1 as a miter saw. The miter saw 1 has a base unit 10, a cutting unit 30, and a supporting unit 40. The base unit 10 holds a workpiece W (FIG. 9 and FIG. 10), which is a wooden piece having a rectangular cross section, for example. The cutting unit 30 includes a motor 33 (FIG. 4), a cutting blade 31, and a housing 30A. The motor 33 generates power to drive the cutting blade 31. The cutting blade 31 is constituted by a circular saw blade having a rotation shaft 31A. The cutting blade 31 further has two side faces with cutting edge therebetween. The housing 30A has a blade cover 300A for covering a part of the cutting blade 31 and a motor housing 300B (FIG. 2) for accommodating the motor 33. The motor housing 300B has a proximal end 300Ba coupled to the blade cover 300A, and a distal end 300Bb far from the blade cover 300A. The motor housing 300B is coupled to be integral with the blade cover 300A through the proximal end 300Ba on the right side of the cutting blade 31. The supporting unit 40 is supported on the base unit 10 to be inclined with respect to the base unit 10. The supporting unit 40 supports the cutting unit 30 to move the cutting unit 30 to and away from the base unit 10. The supporting unit 40 is able to incline in a direction parallel to the normal of the side face of the cutting blade 31.

The base unit 10 includes a base 11 and a turntable 21. The base 11 is placed on the floor. The turntable 21 is supported by the base 11. The turntable 21 has a substantially circular shape as viewed from above, and is rotatable about a center thereof in a horizontal plane. The angular amount of the turntable 21 with respect to the base 11 is referred to as a turned angle. The base 11 has an upper surface 11A which is flush with an upper surface 21A of the turntable 21. The workpiece W is supported on the upper surfaces 11A and 21A to be cut by the cutting blade 31. A pair of fences, a left fence 12A and a right fence 12B, are provided on the upper surface 11A at the position which is substantially a midpoint in the front-back direction of the base 11 (see FIGS. 1 and 2). The fences 12A and 12B stand upright on the upper surface 11A of the base 11. The side faces of the fences 12A and 12B which face the front of the miter saw 1 constitute a holding surface 12C. When the workpiece W abuts on the holding surface 12C and is thereby firmly held, this ensures a stable cutting procedure.

Figure 3:
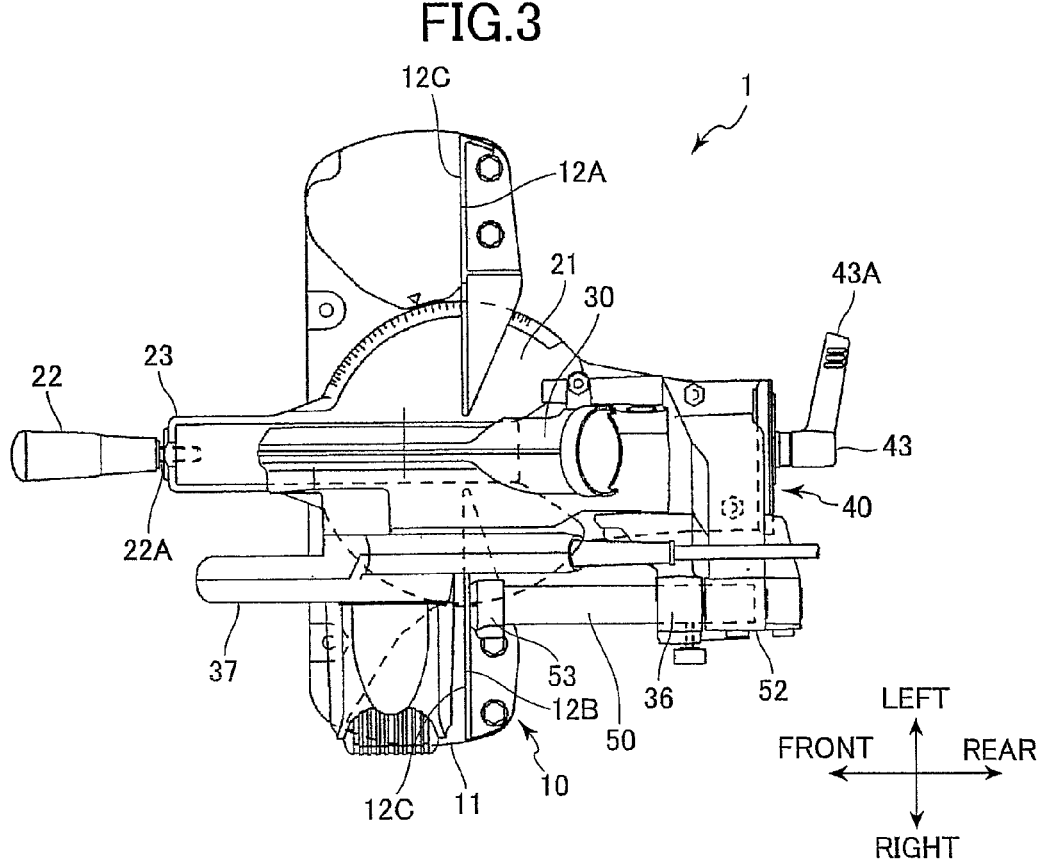
FIG. 3 is a plan view showing the miter saw of FIG. 1.

As shown in FIG. 1, the turntable 21 has a knob 22. The knob 22 protrudes outwards parallel with the upper surface 11A of the base 11 and the upper surface 21A of the turntable 21. As shown in FIG. 3, the knob 22 extends in the radial direction of the turntable 21. The knob 22 is provided at one end of a knob shaft 22A. The knob shaft 22A has a male screw (not shown). The turntable 21 has a frame 23 that extends parallel with the knob shaft 22A and outwards in the radial direction of the turntable 21. The frame 23 has a knob-supporting part (not shown) that has a female screw. The male screw (not shown) of the knob shaft 22A is set in mesh with the knob-supporting part (not shown). Hence, the knob 22 can move with respect to the frame 23 in the radial direction of the turntable 21.

When the knob 22 is turned and thereby moved inwards in the radial direction of the turntable 21, the other end (not shown) of the knob shaft 22A, at which the knob 22 is not coupled, abuts on an arc member (not shown) integrally formed with the base 11. Therefore, the rotation of the turntable 21 with respect to the base 11 is restricted. When the knob 22 is turned in the opposite direction and moved outwards in the radial direction of the turntable 21 from the state where the rotation of the turntable 21 is restricted, the other end (not shown) of the knob shaft 22A leaves the arc member (not shown) of the base 11. As a result, the turntable 21 becomes rotatable with respect to the base 11. To turn the turntable 21, the operator of the miter saw 1 holds and turns the knob 22. The knob 22, the frame 23 and the turntable 21 then move together.

As FIG. 1 shows, the supporting unit 40 is provided at the rear of the turntable 21, stands almost vertically on the turntable 21, and can be rotated together with the turntable 21 with respect to the base 11. The supporting unit 40 is inclinable together with the cutting unit 30 around an inclination shaft 26 only to the left side in FIG. 2. The inclination shaft 26 is secured to the turntable 21 and extends in the front-back direction. The supporting unit 40 is therefore inclined to the upper surface 21A of the turntable 21 by the same angle as the angle at which the side of the cutting blade 31 is inclined. The angle at which the supporting unit 40 is inclined to the upper surface 11A of the base 11, i.e., the angle at which the side of the cutting blade 31 is inclined to the upper surface 11A of the base 11, is referred to as inclination angle hereinafter.

The supporting unit 40 has a clamp bolt 43. The clamp bolt 43 has a clamp lever 43A secured at one end thereof. When the clamp lever 43A is rotated in one direction, the supporting unit 40 is locked and unable to rotate to the left. When the clamp lever 43A is rotated in the other direction, the supporting unit 40 is released and able to rotate to the left.

As shown in FIG. 2, the supporting unit 40 has a stopper 40a at the proximal end that is located near the base unit 10. The stopper 40a is a positioning member for controlling the inclination angle of the supporting unit 40. A stopper bolt 21C vertically extends from the upper surface 21A, and is threadably engaged with the upper surface 21A at the position on the locus of the supporting unit 40 about the inclination shaft 26. In this embodiment, the stopper 40a abuts on the head of the stopper bolt 21C, when the cutting unit 30 is inclined to the left about the inclination shaft 26 along with the supporting unit 40. This mechanism controls the inclination angle of the supporting unit 40 and the cutting unit 30.

More specifically, the stopper 40a is designed to abut on the head of the stopper bolt 21C when the supporting unit 40 and the cutting unit 30 incline leftwards by 45°. Thus, the supporting unit 40 and the cutting unit 30 are limited to incline only to the left by 45° at most about the inclination shaft 26.

As shown in FIG. 2, the supporting unit 40 extends from a substantially central part of the miter saw 1 in the right-left direction to the upper right direction. A first end-holding member 52 made of aluminum alloy is provided on the distal end of the supporting unit 40. The first end-holding member 52 supports two pipes, i.e., two hollow pipes 50 and 51 made of iron. The pipes 50 and 51 extend in the front-back direction. The supporting unit 40 therefore supports the pipes 50 and 51.

As shown in FIG. 1, the two pipes 50 and 51 are supported by the first end-holding member 52 so that the two ends of the respective pipe 50 and 51 are covered with a second end-holding member 53 and the first end-holding member 52, respectively. The pipes 50 and 51 are thereby arranged substantially parallel to each other and form a pair of pipes. Referring to FIGS. 1 and 2, an imaginary plane I containing the axes of the pair of pipes 50 and 51 intersects at substantially perpendicularly to a pivot shaft 32 (FIG. 1) of the cutting unit 30, which extends from the left to the right. The pipes 50 and 51 penetrate through holes (not shown) made in a sliding supporting unit 36, respectively.

Figure 7:
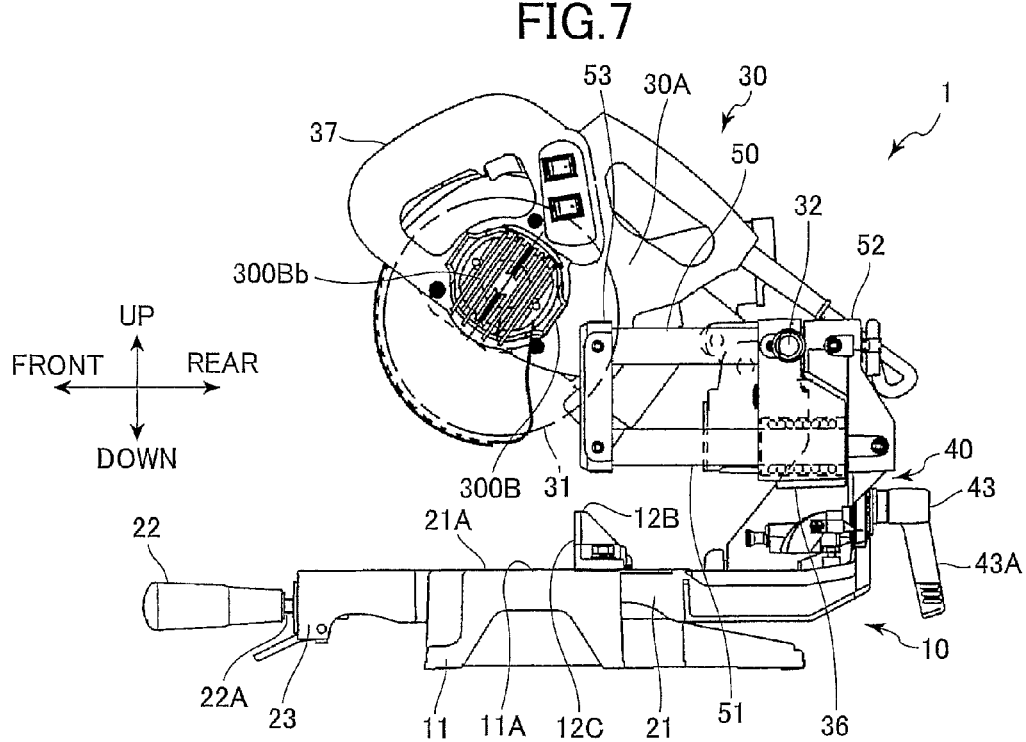
FIG. 7 is a right side view of the miter saw of FIG. 1 with the cutting unit being at the rearmost position.
Figure 8:
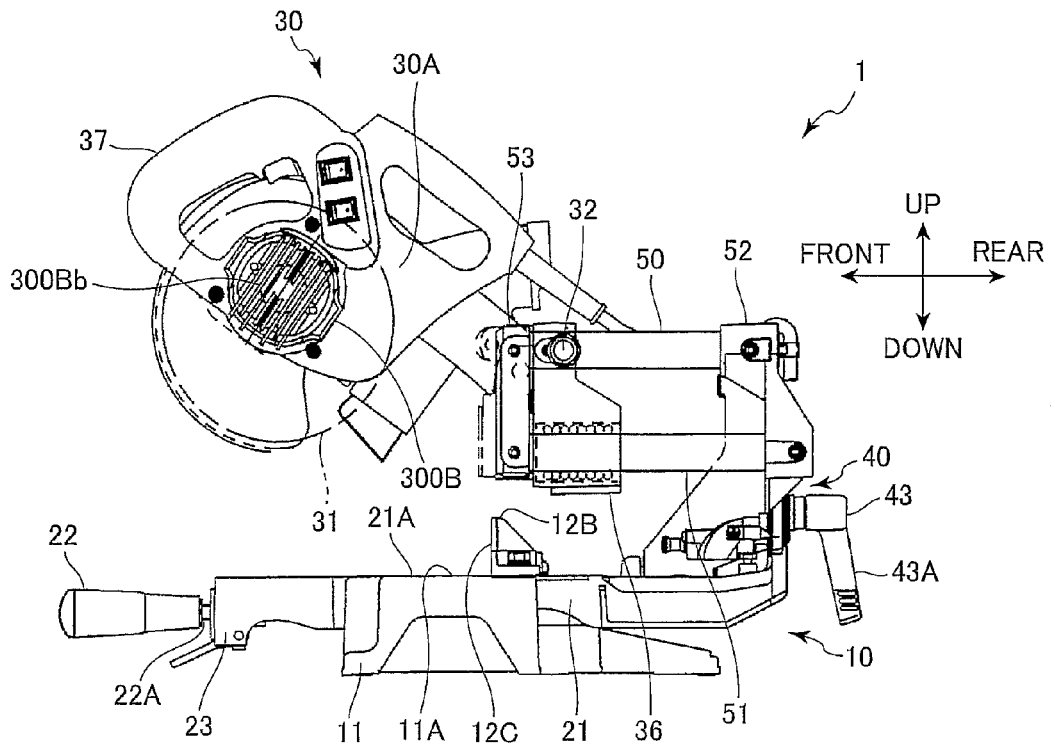
FIG. 8 is a right side view of the miter saw of FIG. 1 with the cutting unit being at the foremost position.

As shown in FIGS. 7 and 8, of the pair of pipes 50 and 51 made of iron, the pipe 50 is shorter than the other pipe 51. As shown in FIG. 8, the part of the first end-holding member 52 holding the pipe 50 is shaped and positioned more forwards than another part of the first end-holding member 52 holding the other pipe 51. Thus, the first end-holding member 52 is able to hold both pipes 50 and 51. Further, the first end-holding member 52 made of aluminum alloy has a greater width than that of the second end-holding member 53. Nonetheless, the miter saw 1 can be made lighter because the pipe 50 is shorter than the other pipe 51.

As described above, the pipes 50 and 51 support the cutting unit 30 by using the sliding supporting unit 36, at any position other than the one end held by the first end-holding member 52. The imaginary plane I containing the axes of the pipes 50 and 51 is positioned substantially parallel to the direction in which the cutting unit 30 moves. As shown in FIG. 2, the pipes 50 and 51 are arranged on the same side as the motor housing 300B provided in the housing 30A with respect to the cutting blade 31. Furthermore, the pipes 50 and 51 are positioned between the cutting blade 31 and that distal end 300Bb of the motor housing 300B in the direction in which the pivot shaft 32 extends.

As shown in FIG. 1, the cutting unit 30 having the cutting blade 31 has the pivot shaft 32 that extends parallel to the rotation shaft 31A of the cutting blade 31. The sliding supporting unit 36 has two through holes (not shown) that extend in the front-back direction for passing the pipes 50, 51, respectively therethrough. The through holes (not shown) of the sliding supporting unit 36 have a substantially circular cross section taken along a line perpendicular to the front-back direction. The pipes 50 and 51 have an outside diameter smaller than the inside diameter of the through holes. The pipes 50 and 51 can therefore slide in the through holes. The directions in which through holes (not shown) extend are substantially identical to the direction perpendicular to the pivot shaft 32.

The pipes 50 and 51 support the cutting unit 30 through the sliding supporting unit 36. Since the two through holes (not shown) of the pipes 50, 51 are arranged parallel to one another in the vertical direction, the imaginary plane I containing the axes of the pipes 50 and 51 is substantially parallel to the direction in which the cutting blade 31 rotates. When the sliding supporting unit 36 slides along the pipes 50 and 51, the cutting blade 31 can move in a direction perpendicular to the pivot shaft 32.

The cutting blade 31 is supported to rotate about the rotation shaft 31A in the blade cover 300A. The upper part of the cutting blade 31 is positioned within the blade cover 300A. The lower part of the cutting blade 31 is exposed outside the blade cover 300A and extends downwards.

A handle 37 is secured to the upper part of the cutting unit 30, as shown in FIG. 1. The operator of the miter saw 1 can grasp the handle 37 to move the cutting unit 30. The cutting unit 30 is always biased upwards by a return spring (not shown). Hence, the cutting unit 30 is held at the highest position by a stopper mechanism (not shown) as shown in FIGS. 1 and 2, unless the operator pushes the cutting unit 30 downwards to cut the workpiece.

Figure 4:
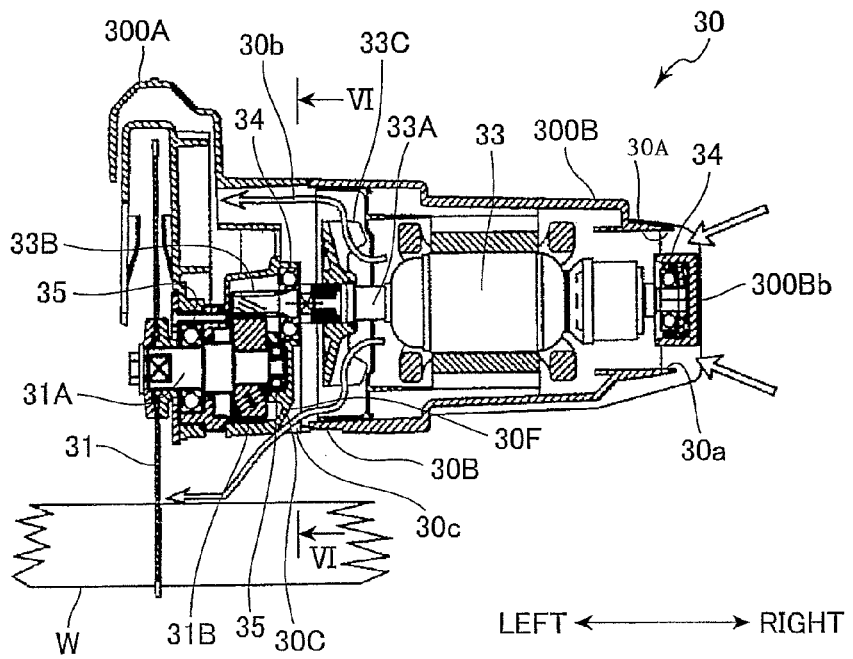
FIG. 4 is a sectional view showing a cutting unit and a housing of the miter of FIG. 1.

A power source (not shown) and the motor 33 are accommodated in the motor housing 300B. Power is supplied from the power source (not shown) to the motor 33. Driven with the power, the motor 33 rotates the cutting blade 31. More specifically, as shown in FIG. 4, an output shaft 33A, i.e., the rotation shaft of the motor 33, extends from the left to the right in FIG. 4, or in the widthwise direction of the miter saw 1 shown in FIG. 2. As FIG. 4 shows, the output shaft 33A is rotatable, supported by bearings 34. A gear 33B is coaxially mounted on the distal end of the output shaft 33A of the motor 33, and can rotate as the output shaft 33A is rotated. A centrifugal fan 33C is secured to the proximal part of the output shaft 33A, and positioned coaxial with the output shaft 33A. The centrifugal fan 33C is configured to generate a fan stream when the motor 33 is driven.

The rotation shaft 31A of the cutting blade 31 is arranged parallel to the output shaft 33A of the motor 33. The rotation shaft 31A is rotatably supported by the blade cover 300A via the bearings 35. The gear 31B is secured to the right part of the rotation shaft 31A of the cutting blade 31, and is set in mesh with the gear 33B mounted on the output shaft 33A of the motor 33. This configuration is a one-stage deceleration unit that can transmit the rotation of the motor 33 to the cutting blade 31 via the gear 33B on the output shaft 33A of the motor 33 and the gear 31B of the rotation shaft 31A of the cutting blade 31. Since the output shaft 33A of the motor 33 and the rotation shaft 31A of the cutting blade 31 are parallel to each other, a drive coupling mechanism that couples the output shaft 33A of the motor 33 and the rotation shaft 31A of the cutting blade 31 can be provided, without using bevel gears.

Fan-stream introducing holes 30a and 30a are provided in the right-hand part of the motor housing 300B, as shown in FIG. 4. These holes 30a and 30a connect the exterior of the motor housing 300B and the interior thereof. In the motor housing 300A, an upper flow path 30b and a fan-stream outlet port 30c are provided. The upper flow path 30b guides the fan stream to the upper part of the cutting blade 31. The fan-stream outlet port 30c connects the interior of the motor housing 300B and the exterior thereof. Thus, the fan stream can flow through the port 30c from the interior of the motor housing 300B to the exterior thereof.

The fan-stream outlet port 30c is made in an outlet-port wall 30B that is a lower part of the motor housing 300B. As shown in FIG. 4, a wall 30C lies on the right side of the rotation shaft 31A of the cutting blade 31 and between the centrifugal fan 33C and the cutting blade 31. The fan stream can flow to the wall 30C. The wall 30C has a surface 30F that inclines to the cutting blade 31, gradually toward the fan-stream outlet port 30c.

Figure 6:
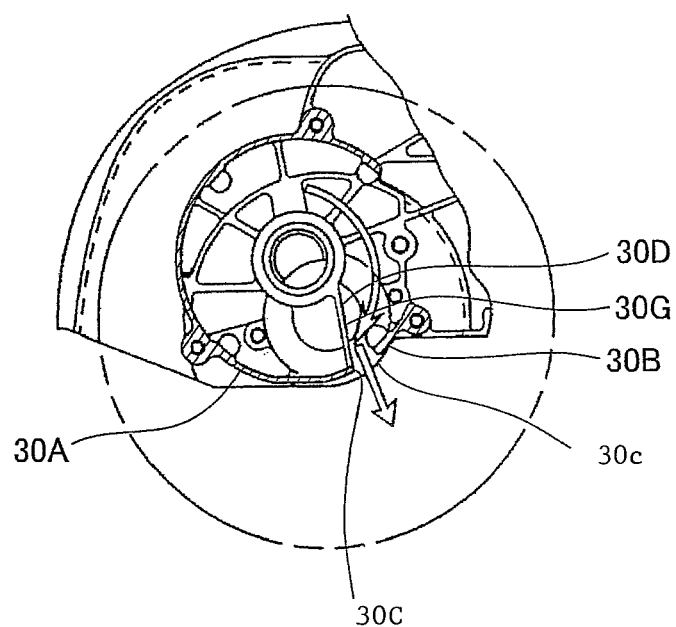
FIG. 6 is a sectional view of the motor housing of the miter saw shown in FIG. 1, taken along lines VI-VI of FIG. 4.

As shown in FIG. 6, a rib 30D is provided in the lower part of the motor housing 300B and between the centrifugal fan 33C and the cutting blade 31. The rib 30D extends from the cutting blade 31 to the centrifugal fan 33C. When the cutting unit 30 is moved to the lowest position thereof, the rib 30D inclines a little backwards from the vertical line and extends from the fan-stream outlet port 30c to a position near the rotation shaft of the centrifugal fan 33C (FIG. 4).

The rib 30D has a surface 30G that inclines to the fences 12A and 12B, gradually toward the fan-stream outlet port 30c. The surface 30G inclines "to the fences 12A and 12B" as viewed from the rotation shaft of the centrifugal fan 33C (in FIG. 2). Note that the fences 12A and 12B (FIG. 7) are arranged at the lower-right part of FIG. 6.

When the centrifugal fan 33C is rotated as the motor 33 is driven, the air outside the motor housing 300B flows in through the fan-stream introducing holes 30a as indicated by the arrow shown in FIG. 4. The air then flows from the right to the left, passing the motor 33. Accelerated by the centrifugal fan 33C, the air becomes a fan stream. A part of the fan stream flows through the upper flow path 30b to the upper part of the cutting blade 31. The remaining part of the fan stream flows from the motor housing 300B through the fan-stream outlet port 30c.

As will be described later, the fan stream flows to a position on the upper surface of the workpiece W and immediately below the cutting blade 31 once the cutting unit 30 has been moved to the lowest position thereof. The fan stream then flows along the upper surface of the workpiece W. A part of the stream flows to the fences 12A and 12B, blowing away the dust from the positions near the fences 12A and 12B and from a position near the cutting blade 31. The dust can therefore be removed.

Thus, the dust does not remain on the workpiece W, without depositing on a cutting line scribed on the workpiece W to be seen by the operator. Particularly, if the workpiece W is moved a little after cut, and the workpiece W is cut again along the cutting line scribed, the cutting line is not concealed with dust that may otherwise is deposited on the workpiece W.

The rib 30D extends from the cutting blade 31 toward the centrifugal fan 33C. The rib 30D has the surface 30G that inclines to the fences 12A and 12B, so that the fan stream can therefore be directed to the fences 12A and 12B. Hence, the fan stream can be applied to a position of the upper surface of the workpiece W relatively close to the fences 12A and 12B. The fan stream flowing to the fences 12A and 12B can be increased. This is why dust can be blown away from the positions near the fences 12A and 12B.

The wall 30C has the surface 30F that inclines to the cutting blade 31 gradually toward the fan-stream outlet port 30c, when the cutting unit 30 is moved to the lowest position. Therefore, the fan stream can be applied to that part of the workpiece W which is near the cutting blade 31 and which is to be cut. Dust can be removed from that part of the workpiece W.

The fan is made from a centrifugal fan 33C, so that the fan can have a higher cooling ability than any axial-flow fan. The centrifugal fan 33C has a large rotation force and can generate a swirling fan steam. As described above, the motor 33, the centrifugal fan 33C, and the cutting blade 31 are coupled by a one-stage deceleration unit. The cutting blade 31 and the centrifugal fan 33C rotate in the opposite directions. As a result, the fan stream flows away from the fences 12A and 12B. Nevertheless, the rib 30D can enhance the fan stream flowing to the fences 12A and 12B. Thus, dust can be blown away from the positions near the fences 12A and 12B.

As described above, the sliding supporting unit 36 is supported to slide along the pipes 50 and 51. Dust can therefore be removed from the workpiece W which is to be cut next, while the operator is sliding the cutting unit 30. If a cutting line has been scribed on the workpiece W, dust can be blown away from the cutting line as the operator slides the cutting unit 30. This enables the operator to see the cutting line and ultimately greatly increases the work efficiency.

Figure 5:
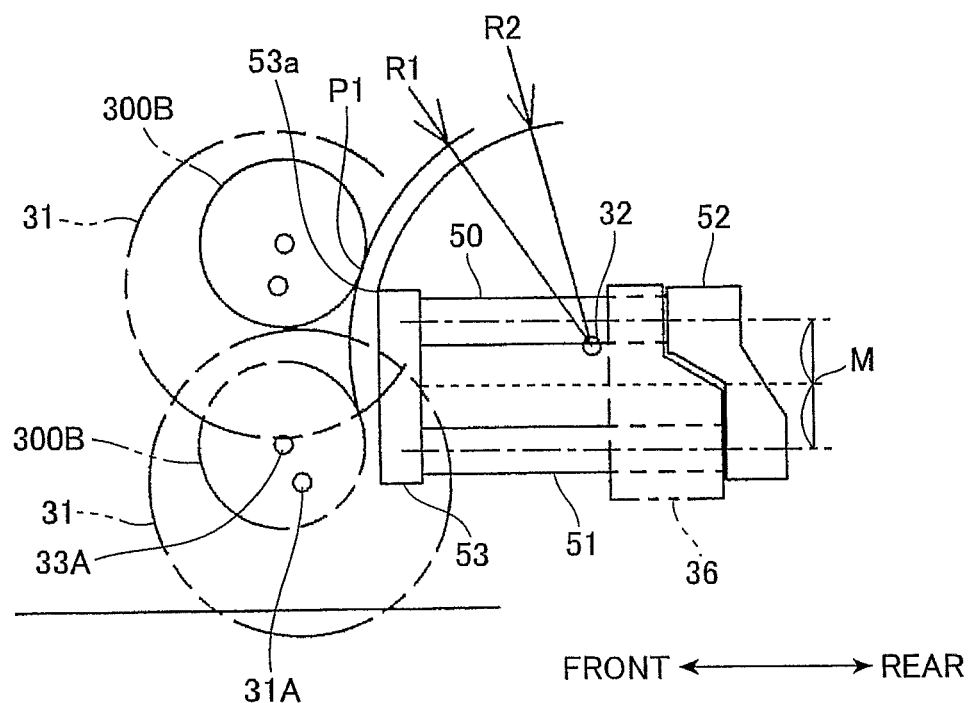
FIG. 5 is a conceptual view illustrating the spacial relationship among a rotary cutting blade, a motor housing, a pair of pipes, and a pivotal shaft.

The motor housing 300B and the pipes 50 and 51 are provided to have the following special spacial relationship, as shown in FIG. 5. When the sliding supporting unit 36 remains at the rearmost position and abutting on the first end-holding member 52, the pipes 50, 51 are provided so that a distance R1 between the pivot shaft 32 and the closest point P1 of the motor housing 300B to the pivot shaft 32 in the imaginary plane I containing the axes of the pipes 50 and 51 and extending in the moving direction of the cutting blade 31 is longer than a distance R2 between the pivot shaft 32 and the upper end 53a of the second end-holding member 53, i.e., the remotest portion of the member 53 from the pivot shaft 32. In order to impart this spacial relationship to the distances R1 and R2, when the cutting unit 30 is moved to the lowest position, the output shaft 33A of the motor 33 is located in front of the rotation shaft 31A of the cutting blade 31. The imaginary plane I extends substantially parallel to the moving direction of the cutting blade 31. The pivot shaft 32 is located above the midpoint between the axes of the pipes 50 and 51.

To make the distances R1 and R2 have the above-mentioned spacial relationship, the pipes 50 and 51 are located on the same side of the cutting blade 31 as the motor housing 300B and between the cutting blade 31 and the distal end 300Bb in the direction in which the pivot shaft 32 extends. In this case, the pipes 50 and 51 or the second end-holding member 53 can be prevented from contacting the motor housing 300B when the cutting unit 30 is moved between the front position and the back position. Hence, the cutting blade 31 can cut the workpiece W if the cutting unit 30 is positioned at any position on the pipes 50, 51 between the front and back positions.

As described above, the pipes 50 and 51 are arranged on the same side of the cutting blade 31 as the motor housing 300B. Thus, the motor housing 300B containing the motor 33, the pipes 50 and 51 or the second end-holding member 53 are prevented from abutting on the workpiece W when the cutting blade 31 is inclined to the other side of the cutting blade 31. The miter saw 1 can therefore be a one-side inclination type in which the cutting blade 31 can sufficiently incline to the left side, not the side on which the motor 33 is provided.

Since the pipes 50 and 51 are arranged on the same side of the cutting blade 31 as the motor 33 is located, the motor 33 need not be arranged above the cutting blade 31, and the miter saw 1 can have a small vertical dimension. As described above, the pipes 50 and 51 are located on the same side of the cutting blade 31 as the motor and between the cutting blade 31 and the distal end 300Bb of the motor housing 300B in the direction in which the pivot shaft 32 extends. Therefore, the pipes 50 and 51 can be prevented from greatly protruding from the region between the cutting blade 31 and the distal end 300Bb of the motor housing 300B in the direction in which the pivot shaft 32 extends. Hence, the size of the miter saw 1 can be reduced in the direction in which the pivot shaft 32 extends. Thus, the miter saw 1 can have a compact configuration.

Since the motor 33 need not be arranged above the cutting blade 31, the drive coupling mechanism that couples the output shaft 33A of the motor 33 and the rotation shaft 31A of the cutting blade 31 can be simple. Therefore, the configuration of the miter saw 1 can be simple and light. In addition, since the imaginary plane I containing the axes of the pipes 50 and 51 extends substantially parallel to the moving direction of the cutting blade 31, the miter saw 1 can be compact, having a small dimension along the pivot shaft 32.

The lowest end of one of the second end-holding member 53 and the pipes 50 and 51 is positioned at a higher level than the lowest end of the motor housing 300B, when the cutting unit 30 is rotated to the lowest position. Therefore, the lowest end of one of the second end-holding member 53 and the pipes 50 and 51 can be prevented from abutting on the workpiece W, while the cutting unit 30 is cutting the workpiece W.

Figure 9:
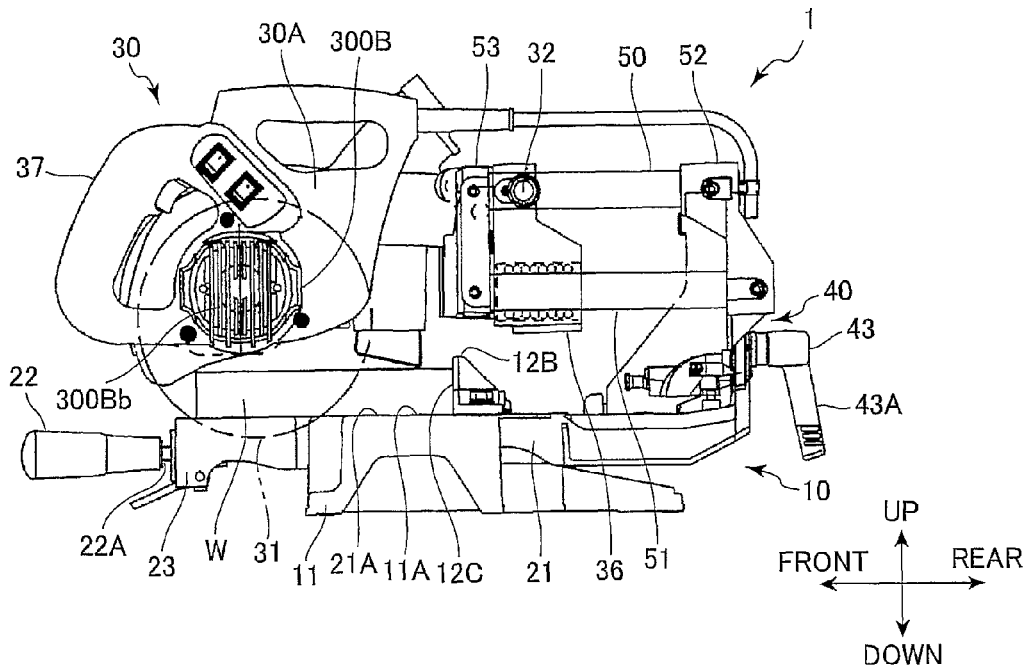
FIG. 9 is a right side view of the miter saw of FIG. 1 with the cutting unit being at the foremost position and lifted downwards.
Figure 10:
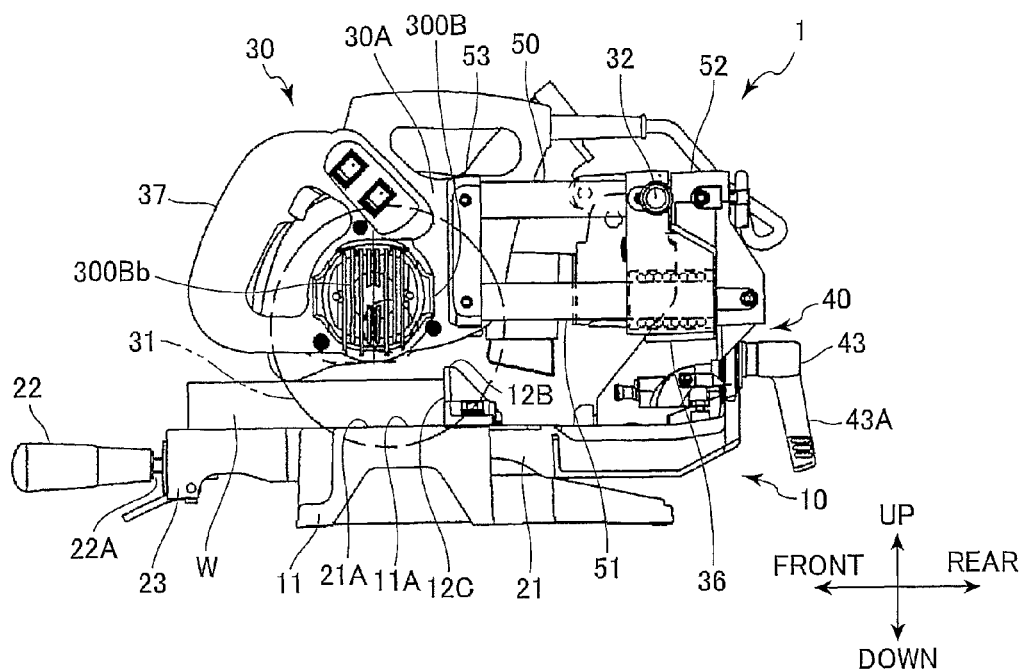
FIG. 10 is a right side view of the miter saw according to the embodiment of the invention, showing the cutting unit moved to the rearmost position and rotated downwards.

To cut the workpiece W (wood bar) along a line perpendicular to the upper surface 21A of the turntable 21, the sliding supporting unit 36 is moved forward along the pair of pipes 50 and 51 until the unit 36 abuts on the second end-holding member 53, whereby the state shown in FIG. 7 changes to the state shown in FIG. 8. While the cutting blade 31 is being rotated, the handle 37 is pushed down as shown in FIG. 9, thus rotating the cutting unit 30 moves down about the pivot shaft 32 against the bias of the spring (not shown).

At this time, the fan stream flowing through the fan-stream outlet port 30c (FIG. 4) is applied to the surface of the workpiece W which is below and near the cutting blade 31, and then flows along the surface of the workpiece W. A part of the fan stream flows to the fences 12A and 12B, blowing away the dust from the workpiece W which is near the fences 12A and 12B and the cutting blade 31.

The operator holding the handle 37 may then move the cutting unit 30 and the sliding supporting unit 36 in the axial direction of the pipes 50 and 51, backwards or perpendicular to the pivot shaft 32. The workpiece W (wood bar) can thereby be cut along a line intersecting at right angles with the upper surface 21A of the turntable 21. At this time, the motor housing 300B or the pipes 50 and 51 do not contact the second end-holding member 53, because distances R1 and R2 have the spacial relationship specified above.

When the workpiece W is cut, the operator stops pushing the handle 37 down. Then, the cutting unit 30 is biased upwards about the pivot shaft 32 by the bias force of the spring (not shown), and returns to the initial position before the handle 37 is pushed down. Thereafter, the operator may repeat the same sequence of work to cut other workpieces W, one after another. Workpieces can be cut at a desired angle, at any inclination or in different angles, by performing the same work procedure.

Miter saws according to the present invention are not limited to the embodiment described above. Various changes and modifications can be made within the scope described in the claims appended hereto. For example, in the miter saw 1 according to the embodiment, the rib 30D extending along the rotation shaft 31A of the cutting blade 31 inclines backwards a little from the vertical direction, and extends from the opening of the fan-stream outlet port 30c to a position near the rotation shaft of the centrifugal fan 33C. The configuration of the rib 30D is not limited to this.

Figure 11:
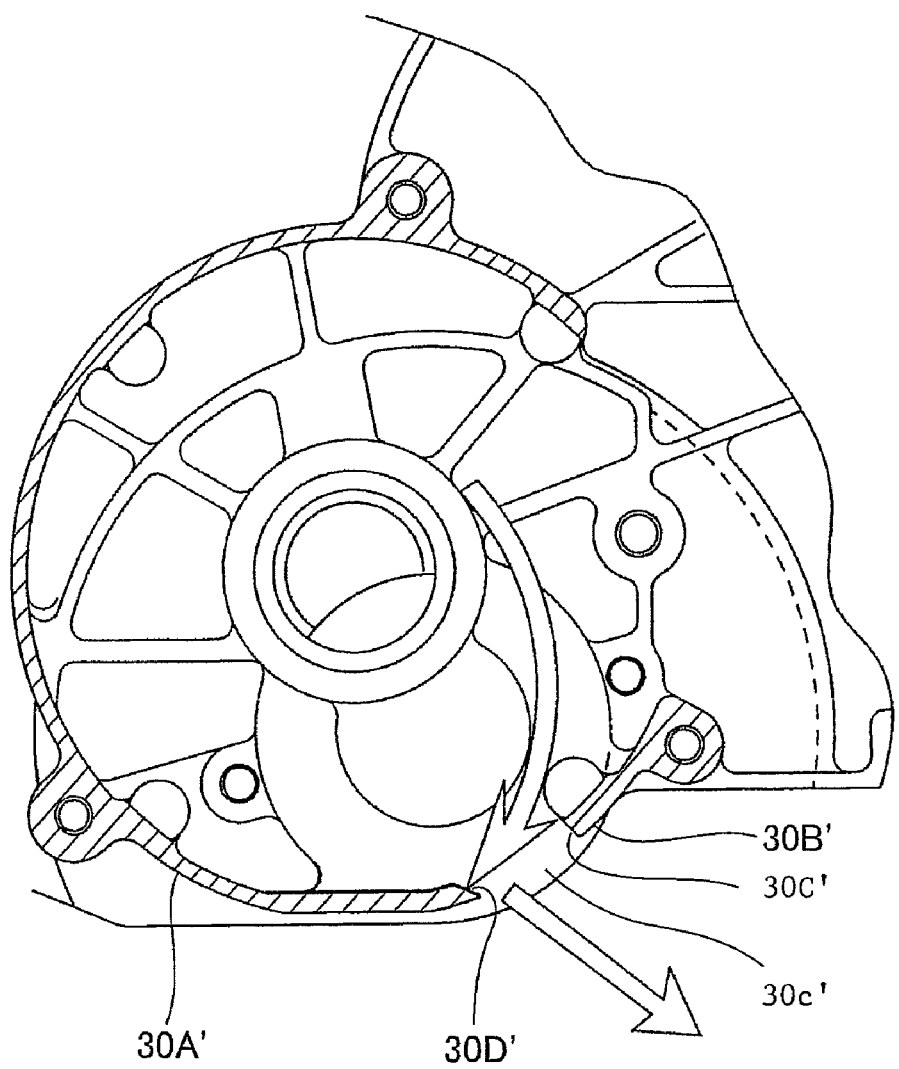
FIG. 11 is a sectional view showing a modification of the miter saw of FIG. 1.

As shown in FIG. 11, which corresponds to FIGS. 4 and 6, for example, and in which primes (') are utilized in the description of corresponding parts, a rib 30D' may be provided on an outlet-port wall 30B' that is one part of the housing 30A' and may extend along the rotation shaft of the centrifugal fan 33C. The rib 30D' does not extend from the opening of the fan-stream outlet port 30c' to a position near the rotation shaft of the centrifugal fan 33 (FIG. 4). Rather, it is provided in the opening of the port 30c' only and the inclines a little downwards and backwards from a horizontal plane.

The pair of pipes 50 and 51, as shown in FIG. 2, are arranged on the same side as the motor 33, as viewed from the direction perpendicular to the pivot shaft 32, and are arranged between the cutting blade 31 and the distal end 300Bb of the housing 30A in the direction in which the pivot shaft 32 extends. It is sufficient for the pipes 50 and 51 to lie, at least in part, at this position.

In the above embodiment, the pipes 50 and 51 are held by the first end-holding member 52 of the supporting unit 40. In place of the first end-holding member 52, a second sliding supporting unit that can slide relative to the pipes 50 and 51 may hold the pipes 50 and 51. Then, the sliding supporting unit 36 can be fixed to the pipes 50 and 51, and the pipes 50 and 51, sliding supporting unit 36 and cutting unit 30 can slide together, back and forth. In this case, another member such as the second end-holding member 53 is required to be provided in addition to the second sliding supporting unit in order to hold the other ends of the pipes 50 and 51. In this configuration, the workpiece can be cut without projecting the pipes 50 and 51 from the back of the miter saw. The back section of the miter saw can therefore be made compact.

Further, in place of the sliding supporting unit 36 that can slide with respect to the pipes 50 and 51, a fixed supporting unit that cannot slide with respect to the pipes 50 and 51 may be used to support the pipes 50 and 51, allowing them to slide with respect to the second sliding supporting unit described above. Then, the cutting unit and the pipes can slide with respect to the base unit.

In the above embodiment, the turntable 21 can rotate and the cutting blade 31 can incline. Alternatively, the circular saw blade may not incline, while the turntable can rotate. Alternatively, the turntable may not rotate, while the circular saw blade can incline.

As described above, the imaginary plane I containing the axes of the pair of pipes 50 and 51 is substantially at right angles to the pivot shaft 32 of the cutting unit 30. Instead, the plane may be parallel to the pivot shaft 32.

The cutting unit 30 of the miter saw 1 can incline only to the left in FIG. 2. However, the cutting unit 30 may incline to the right by a small angle of 3° or 5°.

Industrial Applicability

The present invention is applicable to a power tool such as a miter saw.

The invention claimed is:

1. A miter saw comprising:
a base unit having a surface for supporting a workpiece having a front and rear;
a cutting unit comprising a rotary cutting blade having two side faces, a motor for driving the rotary cutting blade, and a housing having a blade cover for covering a part of the cutting blade and a motor housing connected to the blade cover on one side face of the rotary cutting blade, the motor housing accommodating the motor; and
a supporting unit supported to the base unit for pivotably supporting the cutting unit, the supporting unit being configured to move the cutting unit toward and away from the base unit in a first direction, the supporting unit comprising a guide unit supported with respect to the base unit, and a sliding unit having a pivot shaft pivotably supporting the cutting unit, the guide unit extending parallel to a second direction and having a front end, the second direction being parallel to the surface of the base unit and the one side face of the rotary cutting blade, the sliding unit being slidable on the guide unit to move between a front position and a rear position in the second direction, the front position being adjacent to the front end, the pivot shaft extending in a third direction which is perpendicular to the first and second directions, the motor housing having a proximal end adjacent to the rotary cutting blade and a distal end which extend in the third direction; wherein
at least one part of the guide unit is at a position facing the one side face of the cutting blade and arranged between the cutting blade and the distal end of the motor housing in the third direction;
when the sliding unit is positioned at the rear position, a first distance (R1) between the pivot shaft and a closest point of the motor housing to the pivot shaft in a plane extending in the first direction and containing the guide unit is longer than a second distance (R2) between the pivot shaft and the front end of the guide unit in the plane;
the guide unit comprises a pair of pipes, an imaginary plane containing axes of the pair of pipes is substantially parallel to the first direction and substantially parallel to the one face of the cutting blade, and the pivot shaft is located above a midpoint between the axes in the first direction; and
one pipe of the pair of pipes is shorter than an other pipe of the pair of pipes.

2. The miter saw as claimed in claim 1, characterized in that the supporting unit is configured to movably tilt the cutting unit in the third direction.

3. The miter saw as claimed in claim 1, characterized in that the rotary cutting blade has a rotary shaft, the motor has a motor shaft, when the cutting unit is positioned at a lowest position in the first direction, the motor shaft is located ahead of the rotary shaft of the rotary cutting blade in the second direction.

4. A miter saw comprising:
a base unit having a front and rear and having a surface for supporting a workpiece;
a cutting unit comprising a rotary cutting blade having two side faces, a motor for driving the rotary cutting blade, and a housing having a blade cover for covering a part of the cutting blade and a motor housing connected to the blade cover on one side face of the rotary cutting blade, the motor housing accommodating the motor; and
a supporting unit supported on the base unit for pivotably supporting the cutting unit, the supporting unit being configured to move the cutting unit toward and away from the base unit in a first direction,
the supporting unit comprising a guide unit supported with respect to the base unit, the guide unit comprising a pair of guide pipes, a sliding unit having a pivot shaft pivotably supporting the cutting unit, and a holding member fixing one end of the pair of guide pipes of the guide unit, the pair of guide pipes of the guide unit extending parallel to a second direction and having a front end and a rear end, the second direction being parallel to the surface of the base unit and the one side face of the rotary cutting blade, the sliding unit being slidable on the pair of guide pipes of the guide unit to move between a front position toward the front of the base unit and a rear position toward the rear of the base unit in the second direction and enabling sliding movement of the cutting unit therewith, the front position of the sliding unit including a front portion of the sliding unit being disposed adjacent to the front end of the pair of guide pipes of the guide unit and the rear position of the sliding unit including a rear portion of the sliding unit being disposed adjacent to the rear end of the pair of guide pipes of the guide unit, the pivot shaft extending in a third direction which is perpendicular to the first and second directions, the motor housing having a proximal end adjacent to the rotary cutting blade and a distal end, the motor housing extending in the third direction, wherein
at least one part of the guide unit is at a position facing the one side face of the cutting blade and arranged between the cutting blade and the distal end of the motor housing in the third direction,
when the sliding unit is positioned at the rear position with the rear portion being disposed adjacent to the rear end of the guide unit, a first distance (R1) between the pivot shaft and a closest point of the motor housing to the pivot shaft in a plane extending in the first direction and containing the guide unit is longer than a second distance (R2) between the pivot shaft and the front end of the guide unit in the plane,
an imaginary plane containing axes of the pair of guide pipes is substantially parallel to the first direction and substantially parallel to the one face of the cutting blade, and the pivot shaft is located above a midpoint between the axes in the first direction, and
one guide pipe of the pair of guide pipes is shorter than an other pipe of the pair of guide pipes.

5. The miter saw as claimed in claim 4, characterized in that when the cutting unit is positioned at a lowest position in the first direction,
a lowest end of the pair of guide pipes is positioned above a lowest end of the motor housing in the first direction.

* * * * *